W. S. HARLOW.
SWITCH.
APPLICATION FILED APR. 29, 1909.
1,103,511.
Patented July 14, 1914.
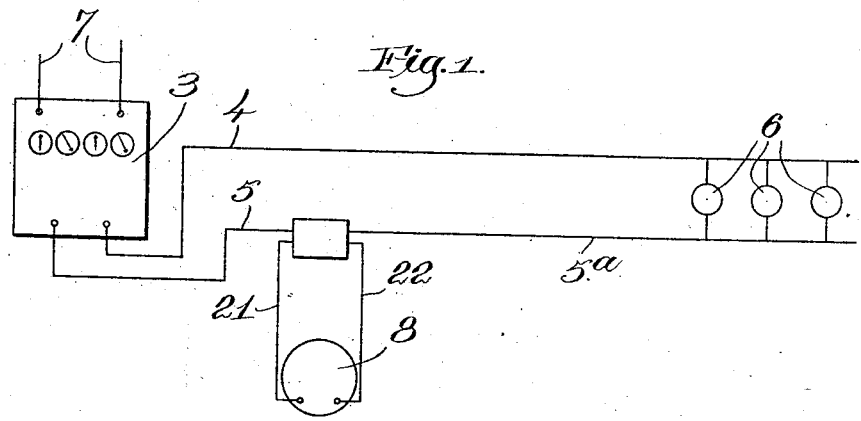
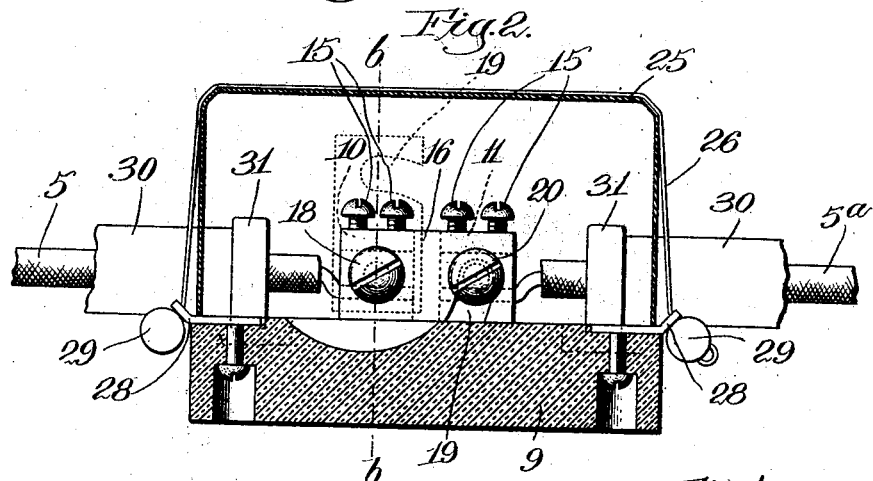
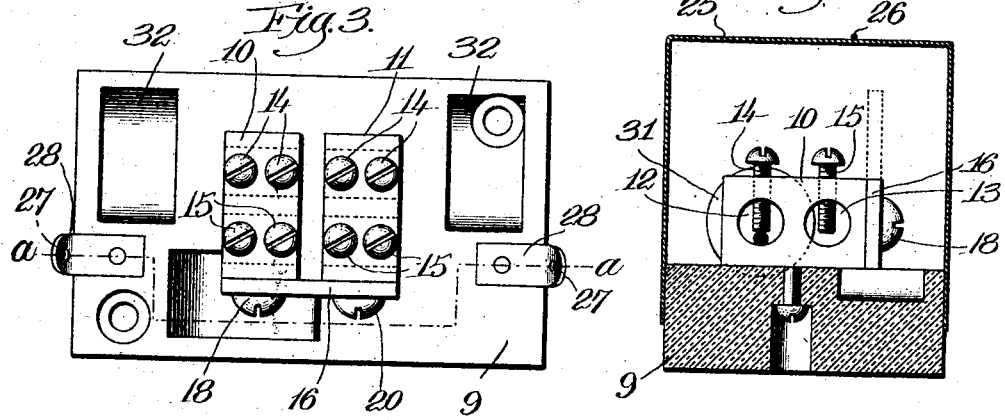
Witnesses.
Thomas J. Drummond.
Joseph M. Ward.
Inventor.
William S. Harlow,
by Kenly & Gregory Attys.

UNITED STATES PATENT OFFICE.

WILLIAM S. HARLOW, OF SWAMPSCOTT, MASSACHUSETTS.

SWITCH.

1,103,511.   Specification of Letters Patent.   Patented July 14, 1914.

Application filed April 29, 1909. Serial No. 492,959.

*To all whom it may concern:*

Be it known that I, WILLIAM S. HARLOW, a citizen of the United States, residing at Swampscott, county of Essex, and State of Massachusetts, have invented an Improvement in Switches, of which the following description, in connection with the accompanying drawing, is a specification, like letters on the drawing representing like parts.

In order to test electric meters, it is customary to place a testing instrument in one side of the consumption circuit extending from the meter, and to do this involves breaking the circuit at the point where the testing instrument is to be inserted and connecting the instrument to the circuit so that said instrument will be in series with the translating devices.

My invention aims to provide a novel switch which facilitates greatly this operation of connecting the testing instrument in series with the translating devices, and by means of which the instrument can be connected up without breaking the circuit so as to affect the lights or other translating devices.

I will first describe one embodiment of my invention and then point out the novel features thereof in the appended claims.

In the drawings, Figure 1 is a diagrammatic view showing the manner in which my switch is used; Fig. 2 is a section through the completed switch, said section being taken on substantially the line $a-a$, Fig. 3; Fig. 3 is a top plan view of the base of the switch; Fig. 4 is a section on the line $b-b$, Fig. 2.

In the drawing 3 designates the meter from which extend the wires 4 and 5 of the consumption circuit that supplies current to the translating devices 6.

7 are the wires of the main circuit leading to the meter 3.

In testing the meter it is customary to use a testing instrument which is designated generally by 8 and which is inserted in one of the mains of the consumption circuit, so that said instrument is in series with the translating devices. My improved switch is especially designed to permit the testing instrument 8 to be thus connected without breaking the circuit through the translating devices, and in the present embodiment of my invention, said switch comprises a base 9 of insulating material which is adapted to be secured to a wall or other support at some convenient point adjacent the meter 3. This base has thereon two terminals 10 and 11, each constructed to have secured thereto two wires. While these terminals may have any suitable construction, I have shown each of them as having two wire-receiving apertures 12, 13, into which the wires may be inserted, and as carrying clamping screws 14, 15 for engaging the wires occupying the apertures and clamping said wires in position. These terminals are adapted to be electrically connected together by means of a switch member 16, and said switch member is so constructed that it can be swung into such a position as to break the electrical connection between the terminals. I find it convenient to so pivot the switch member to one of the terminals that it may be brought into or out of engagement with the other terminal. As herein shown the switch member is pivoted to the end of the terminal 10 by means of a screw 18, and said switch member is provided with a slot 19 which is adapted to fit over the shank of a screw 20 that is carried by the end of the terminal 11, said screw 20 acting as a keeper. When the switch member 16 is in the full line position Figs. 2 and 3, the terminals will be electrically connected together through the switch member, but if the switch member is swung into the dotted line position Figs. 2 and 4, the two terminals will be disconnected from each other as will be obvious. Under ordinary conditions the switch member 16 is in the full line position, thus connecting the two terminals 10 and 11, and it may be held in such position by tightening up the screw 20 which then acts as a clamping screw to hold the switch member in position.

The wire 5 leading from the meter is connected to the terminal 10 and another wire $5^a$ is connected to the terminal 11 and leads to the translating devices, the two wires 5, $5^a$ constituting one side of the consumption circuit.

When it is desired to connect up the testing instrument 8, the two wires 21 and 22 leading therefrom are placed in the wire-receiving apertures 13 of the two terminals 10 and 11 and are clamped therein by means of the clamping screws 15. This may be readily done as will be obvious without breaking the consumption circuit. After the instrument is properly connected the screw 20 may be loosened and the switch member 16 thrown into the dotted line position Fig. 2 thereby throwing all the current around through the testing instrument. When the meter has been properly tested, the switch member 16 is thrown back into the full line position and the instrument may then be disconnected, all of which can be done without disturbing in any way the flow of current through the translating devices.

In order to prevent unauthorized persons from tampering with the switch I have provided means for sealing the switch so that the inspector can readily determine whether the switch has been disturbed since his last visit. In thus sealing the switch, I have herein shown a cover 25 which is adapted to be applied to the block or base 9, and which covers and incloses both of the terminals and the switch member 16. This cover is held in position by means of a sealing wire 26 which passes thereover, and the ends of which pass through apertures 27 in ears 28 extending from the base, and are provided with seals 29. The wires 5, 5ª are led through insulating tubes 30 which extend through apertures in the cover 25, and these tubes are provided with flanges or heads 31 on their inner ends which are partially received by recesses 32 formed in the base 9. The apertures in the end of the cover 25 fit the insulating tubes 30 and thus said tubes cannot be withdrawn except when the cover is removed.

The cover 25 is shown as provided on its sides with extensions 35 which embrace the sides of the insulating block 9. At the ends of the insulating block the lower edge of the cover rests on the top thereof, as shown in Fig. 2. These extensions 35 act as a means for insuring the proper positioning of the cover on the base.

I have shown herein only one embodiment of my invention and it will be obvious that various changes may be made in the constructional parts without departing from the invention.

Having fully described my invention, what I claim as new and desire to secure by Letters Patent is:—

1. In an entering switch, the combination with a base of insulating material provided with two recesses in its upper face, of two terminals sustained by the base, means to electrically connect said terminals, a cover inclosing said terminals and provided with openings opposite the terminals, sealed means connecting the cover to the base, and insulating tubes for the line wire extending through the openings in the cover and provided with flanges which occupy the recesses in the base.

2. In an entering switch, the combination with a base of insulating material provided with two recesses in its upper face, of two terminals sustained by the base, means to connect said terminals electrically, a cover inclosing said terminals and provided on opposite sides with extensions to embrace the base, ears extending from the opposite ends of the base and projecting beyond the casing, a sealing wire extending through said ears and inclosing the cover, and insulating tubes for the line wires extending through openings in the ends of the cover and provided with flanges which occupy the recesses in the base.

3. In an entering switch, the combination with a base, of two terminals sustained thereby, a cover inclosing said terminals and provided with extensions on opposite sides which embrace the sides of the base, ears extending from the ends of the base, and a sealing wire extending through said ears and inclosing the cover.

In testimony whereof, I have signed my name to this specification, in the presence of two subscribing witnesses.

WILLIAM S. HARLOW.

Witnesses:
BERTHA F. HEUSER,
THOMAS J. DRUMMOND.